(12) United States Patent  
Nishimori

(10) Patent No.: US 7,161,337 B2  
(45) Date of Patent: Jan. 9, 2007

(54) MULTIPHASE DC-DC CONVERTER

(75) Inventor: Eiji Nishimori, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 32 days.

(21) Appl. No.: 11/145,232

(22) Filed: Jun. 6, 2005

(65) Prior Publication Data

US 2006/0158159 A1 Jul. 20, 2006

(30) Foreign Application Priority Data

Jan. 19, 2005 (JP) ............................. 2005-012045

(51) Int. Cl.
G05F 1/40 (2006.01)
G05F 1/44 (2006.01)
G05F 1/56 (2006.01)

(52) U.S. Cl. ...................... 323/271; 323/272; 323/284

(58) Field of Classification Search ................. 363/65; 323/265, 271, 272, 282, 284

See application file for complete search history.

(56) References Cited

U.S. PATENT DOCUMENTS

| | | | | |
|---|---|---|---|---|
| 4,729,086 A | * | 3/1988 | Lethellier | ..................... 363/65 |
| 6,144,194 A | * | 11/2000 | Varga | .......................... 323/285 |
| 6,424,129 B1 | * | 7/2002 | Lethellier | ................... 323/272 |
| 6,788,036 B1 | * | 9/2004 | Milavec et al. | ............. 323/272 |
| 6,940,261 B1 | * | 9/2005 | Umminger | .................. 323/282 |

FOREIGN PATENT DOCUMENTS

JP 2002-078321 3/2002

* cited by examiner

*Primary Examiner*—Bao Q. Vu  
(74) *Attorney, Agent, or Firm*—Arent Fox PLLC

(57) ABSTRACT

A multiphase DC-DC converter that equalizes the output current of a plurality of converter units while improving responsiveness with respect to sudden changes in the output voltage. The converter includes a control unit for controlling the converter units. The control unit includes a comparator for comparing the output voltage of each of the converter units with a reference voltage, a first control circuit for sequentially selecting each of the converter units in accordance with an output signal of the comparator to activate the output transistor of the selected converter unit, and a second control circuit for controlling the inactivation timing of the output transistors of the converter units so as to equalize the output current of the converter units.

15 Claims, 8 Drawing Sheets

MULTIPHASE DC-DC CONVERTER

CROSS-REFERENCE TO RELATED APPLICATIONS

This application is based upon and claims the benefit of priority from the prior Japanese Patent Application No. 2005-012045, filed on Jan. 19, 2005, the entire contents of which are incorporated herein by reference.

BACKGROUND OF THE INVENTION

The present invention relates to a converter, and more particularly, to a multiphase DC-DC converter.

FIG. 1 is a schematic block circuit diagram of a current-mode DC-DC converter 100. The converter 100 includes a control unit 1a and a converter unit 50. The converter unit 50 includes an output transistor T1 formed by an N-channel MOS transistor, a synchronous rectifying transistor T2 formed by an N-channel MOS transistor, a choke coil L1, a current detection resistor Rs1, and a smoothing capacitor C1.

The control unit 1a generates output signals DH1 and DL1, which are complementary signals, and provides the output signal DH1 to the gate of the output transistor T1 and the output signal DL1 to the gate of the synchronous rectifying transistor T2.

An input voltage Vi is supplied to the drain of the output transistor T1. When the output signal DH1 rises to an H level, the output transistor T1 is activated, and an output voltage Vo is output from an output terminal via the choke coil L1 and the current detection resistor Rs1. When the output signal DL1 rises to H level, the synchronous rectifying transistor T2 is activated, and the energy stored in the choke coil L1 is output as the output voltage Vo. The output voltage Vo is smoothed by the smoothing capacitor C1.

The input voltage Vi is supplied to the control unit 1a as voltage from a power source Vcc. A voltage amplifier 2 of the control unit 1a is supplied with the voltage between the two terminals of the current detection resistor Rs1. The voltage amplifier 2 amplifies the voltage generated between the terminals of the current detection resistor Rs1 in accordance with output current flowing through the current detection resistor Rs1 and provides an amplified signal to a comparator 3.

The control unit 1a has an error amplifier 4 for amplifying the voltage difference between a reference voltage e1 and a voltage obtained by dividing the output voltage Vo with resistors R1 and R2. Then, the error amplifier 4 provides the amplified signal to the comparator 3. The reference voltage e1 is set to be equal to the divided voltage generated by the resistors R1 and R when the output voltage Vo reaches a specified value.

The comparator 3 compares the voltage of the amplified signal provided from the voltage amplifier 2 with the voltage of the amplified signal provided from the error amplifier 4. When the voltage of the amplified signal from the voltage amplifier 2 is higher than that of the amplified signal from the error amplifier 4, the comparator 3 provides an H level comparison signal to the reset terminal R of a flip-flop circuit FF1. When the voltage of the amplified signal from the voltage amplifier 2 is lower than that of the amplified signal from the error amplifier 4, the comparator 3 provides an L level comparison signal to the reset terminal R.

A pulse signal with a fixed frequency is provided to the set terminal S of the flip-flop circuit FF1 by an oscillator 5. When the set terminal S receives an H level pulse signal, the flip-flop circuit FF1 generates an H level output signal Q and an L level output signal /Q. When the reset terminal R receives an H level comparison signal, the flip-flop circuit FF1 generates an L level output signal Q and an H level output signal /Q. The control unit 1a outputs the output signal Q of the flip-flop circuit FF1 as the output signal DH1 and the output signal /Q as the output signal DL1.

In response to a rising edge of the pulse signal from the oscillator 5, the control unit 1a turns the output transistor T1 on at constant cycles. When the output transistor T1 is activated, the current flowing through the choke coil L1 and the current detection resistor Rs increases to raise the voltage of the amplified signal from the voltage amplifier 2. When the voltage of the amplified signal from the voltage amplifier 2 becomes higher than the voltage of the amplified signal from the error amplifier 4, an H level output signal is provided to the reset terminal R of the flip-flop circuit FF1. As a result, the output transistor T1 is inactivated, the synchronous rectifying transistor T2 is activated, and the energy stored in the choke coil L1 is output.

If the output voltage Vo decreases during the on/off operation of the output transistor, the voltage of the amplified signal from the error amplifier 4 becomes higher than the voltage of the amplified signal of the voltage amplifier 2, and the output signal of the comparator 3 rises to an H level only after a relatively long time elapses. This prolongs the activation time of the output transistor T1. If the output voltage Vo increases, the voltage of the amplified signal from the error amplifier 4 becomes lower than the voltage of the amplified signal from the voltage amplifier 2, and the output signal of the comparator 3 rises to H level in a relatively short period of time. This shortens the activation time of the output transistor T1. The output transistor T1 is thus activated at constant cycles in accordance with the output signal frequency of the oscillator 5. The timing at which the output transistor T1 is inactivated is determined in accordance with the increase of the output current. The inactivation timing of the output transistor thus changes in accordance with the increase or decrease of the output voltage Vo. This keeps the output voltage Vo constant.

FIG. 2 is a schematic block circuit diagram of a voltage-mode DC-DC converter 200. The converter 200 includes a control unit 1b and a converter unit 60. The converter unit 60 has the same configuration as the converter unit 50 in FIG. 1 except in that the current detection resistor Rs1 is omitted.

An error amplifier 4 of the control unit 1b amplifies a voltage difference between a reference voltage e1 and a voltage obtained by dividing an output voltage Vo with resistors R1 and R2. Then, the error amplifier 4 provides the amplified signal to a non-inverting input terminal of a PWM comparator 6. The reference voltage e1 is set to be equal to the divided voltage generated by the resistors R1 and R2 when the output voltage Vo reaches a specified value.

A triangular wave signal with a fixed frequency is provided to an inverting input terminal of the PWM comparator 6 from a triangular wave oscillator 7. When the voltage of the amplified signal at the non-inverting input terminal is higher than the voltage of the triangular wave signal at the inverting input terminal, the PWM comparator 6 generates an H level output signal Q and an L level output signal /Q. When the voltage of the amplified signal at the non-inverting input terminal is lower than the voltage of the triangular wave signal at the inverting input terminal, the PWM comparator 6 generates an L level output signal Q and an H level output signal /Q.

The PWM comparator 6 provides the output signal Q to the gate of the output transistor T1 as an output signal DH1 of the control unit 1b and the output signal /Q to the gate of the synchronous rectifying transistor T2 as an output signal DL1 of the control unit 1b.

In the voltage-mode DC-DC converter 200, the output transistor T1 is activated at constant cycles in accordance with the triangular wave signal from the triangular wave oscillator 7. When the output voltage Vo increases, the output voltage of the error amplifier 4 is decreased to shorten the activation time of the output transistor T1. When the output voltage Vo decreases, the output voltage of the error amplifier 4 is increased to prolong the activation time of the output transistor T1. Such operation keeps the output voltage Vo constant based on the reference voltage e1.

FIG. 3 is a schematic block circuit diagram of a fixed activation time DC-DC converter 300. The converter 300 includes a control unit 1c and a converter unit 60.

A comparator 8 of the control unit 1c compares a reference voltage e1 with a voltage obtained by dividing the output voltage Vo resistors R1 and R2. When the divided voltage generated by the resistors R1 and R2 is higher than the reference voltage e1, the comparator 8 generates an L level comparison signal. When the divided voltage is lower than the reference voltage e1, the comparator 8 generates an H level comparison signal. The reference voltage e1 is set to be equal to the divided voltage generated by the resistors R1 and R2 when the output voltage Vo reaches a specified value.

The comparison signal of the comparator 8 is provided to a one-shot flip-flop circuit FF. The one-shot flip-flop circuit FF generates complementary signals Q and /Q in accordance with the comparison signal. The one-shot flip-flop circuit FF keeps the output signal Q at an H level for a predetermined period of time in response to an H level comparison signal from the comparator 8.

The output signal Q of the one-shot flip-flop circuit FF is provided to the gate of an output transistor T1 as an output signal DH1 of the control unit 1c. The output signal /Q is provided to the gate of a synchronous rectifying transistor T2 as an output signal DL1 of the control unit 1c.

In the fixed activation time DC-DC converter 300, the output voltage Vo increases when the output transistor T1 is activated. When the output transistor T1 is inactivated, the energy stored in a choke coil L1 is discharged. The decrease of the energy stored in the choke coil L1 lowers the output voltage Vo. When the divided voltage generated by the resistors R1 and R2 becomes lower than the reference voltage e1, the one-shot flip-flop circuit FF generates an H level output signal Q for a predetermined period of time. Thus, the output transistor T1 is activated.

This operation keeps the output signal Vo based on the reference voltage e1 constant. In the converter 300, the activation time of the output transistor T1 is fixed regardless of changes in the output voltage Vo. However, a decrease in the output voltage Vo shortens the inactivation time of the output transistor T1. Thus, the switching frequency of the output transistor T1 changes in accordance with the output voltage Vo.

FIG. 4 is a schematic block circuit diagram of a two-phase multiphase DC-DC converter 400 in which two current-mode DC-DC converters 100 of FIG. 1 are operated in parallel. The converter 400 includes a control unit 1d and converter units 9a and 9b. Each of the converter units 9a and 9b has the same configuration as the converter unit 50 in FIG. 1. The converter units 9a and 9b share a single smoothing capacitor C1.

The control unit 1d includes a voltage amplifier 2a for amplifying the voltage between the two terminals of a current detection resistor Rs1 of the converter unit 9a, a voltage amplifier 2b for amplifying the voltage between the two terminals of a current detection resistor Rs2 of the converter unit 9b, a comparator 3a for comparing the output voltage of the voltage amplifier 2a with the output voltage of the error amplifier 4, and a comparator 3b for comparing the output voltage of the voltage amplifier 2b with the output voltage of the error amplifier 4. The control unit 1d further includes a flip-flop circuit FF1, for generating output signals DH1 and DL1 that control the converter unit 9a in accordance with the comparison signal of the comparator 3a, and a flip-flop circuit FF2, for generating output signals DH2 and DL2 that control the converter unit 9b in accordance with the comparison signal of the comparator 3b.

An oscillator 5a provides a pulse signal to the set terminals S of the flip-flop circuits FF1 and FF2. More specifically, the oscillator 5a generates a pulse signal with a frequency that is twice the frequency of the oscillator 5 in FIG. 1 and provides the pulse signal alternately to the flip-flop circuits FF1 and FF2.

The control unit id operates the converter units 9a and 9b in the same manner and at the same frequency as the converter unit 50 of the current-mode DC-DC converter 100 in FIG. 1. However, since the operational phases of the flip-flop circuits FF1 and FF2 are offset 180 degrees from each other, the converter 400 operates a load with a frequency that is substantially two times greater.

FIG. 5 is a schematic block circuit diagram of a two-phase multiphase DC-DC converter 500 in which two fixed activation time DC-DC converters of FIG. 3 are operated in parallel. The converter 500 includes a control unit 1e and converter units 10a and 10b. Each of the converter units 10a and 10b has the same configuration as the converter unit 60 of FIG. 3. The converter units 10a and 10b share a single smoothing capacitor C1.

The control unit 1e includes resistors R1 and R2 for dividing the output voltage Vo, a comparator 8 for comparing the divided voltage generated by the resistors R1 and R2 with a reference voltage e1, and an order control circuit 11 for alternately outputting a comparison signal generated by the comparator 8 to two one-shot flip-flop circuits FFa and FFb. The one-shot flip-flop circuit FFa generates output signals DH1 and DL1 for controlling the converter unit 10a. The one-shot flip-flop circuit FFb generates output signals DH2 and DL2 for controlling the converter unit 10b.

The control unit 1e operates the converter units 10a and 10b in the same manner as the converter unit 60 of the fixed activation time DC-DC converter 300 in FIG. 3. However, the respective output transistors T1 of the converter units 10a and 10b are activated alternately by the order control circuit 11. Therefore, in the converter 500, the inactivation time of the output transistors T1 is longer than in the converter 400 of FIG. 3. This enables substantial decrease of the switching frequency of the output transistors T1. Additionally, when the output voltage Vo suddenly decreases due to a change in the load, the output transistors T1 of the converter units 10a and 10b are successively activated in accordance with the response speed of the comparator 8. The DC-DC converter 500 has superior response speed when the load suddenly changes.

Japanese Patent Laid-Open Publication No. 2002-78321 describes a DC-DC converter similar to the above DC-DC converter.

SUMMARY OF THE INVENTION

Semiconductor devices such as CPUs employed in portable equipment such as portable electronic devices have not only been increasing processing speed and functions but have also been decreasing the operational voltage and increasing the output current. As a result, there has been a demand for a DC-DC converter having a lower output voltage and a higher output current. There has also been a demand for a CPU with improved responsiveness to sudden changes in the load. In order to improve the response speed of a DC-DC converter with respect to a decrease in the output voltage due to a sudden change in the load, it is preferable that the switching cycle of the output transistor be shortened.

In the current-mode DC-DC converter 100 of FIG. 1, the switching cycle of the output transistor T1 is determined by the oscillator 5, and can be shortened by increasing the frequency of the pulse signal of the oscillator 5.

Generally, the ratio of an input voltage Vi relative to an output voltage Vo is equal to the ratio of a switching cycle of the output transistor T1 relative to the activation time of the transistor T1. Therefore, the activation time of the output transistor T1 becomes shorter as the specified value of the output voltage Vo is set lower. Accordingly, the switching frequency of the output transistor is substantially higher than the pulse signal frequency of the oscillator 5.

If the switching cycle of the output transistor is further shortened under such circumstances, the operation efficiency of the output transistor will be lowered due to the gate capacity of the output transistor. Therefore, it is difficult to improve the load responsiveness by further increasing the switching frequency of the output transistor.

In the voltage-mode DC-DC converter 200 of FIG. 2, the switching cycle of the output transistor T1 is determined by the triangular wave oscillator 7. Therefore, like the current-mode DC-DC converter 100 of FIG. 1, it is difficult to ensure high load responsiveness by increasing the switching frequency of the output transistor of the voltage-mode DC-DC converter 200.

In the fixed activation time DC-DC converter 300 of FIG. 3, the inactivation time of the output transistor T1 changes in response to changes in the output voltage Vo. Therefore, the switching frequency of the output transistor T1 substantially changes in accordance with changes in the output voltage Vo. Change in the output voltage Vo is detected by the comparator 8, which has a higher operation speed than the voltage amplifier 2 of FIG. 1 and the error amplifier 4 of FIG. 2. Thus, the fixed activation time DC-DC converter 300 has superior load responsiveness compared with the current-mode DC-DC converter 100 of FIG. 1 and the voltage-mode DC-DC converter 200 of FIG. 2.

The multiphase DC-DC converter 400 of FIG. 4 operates a load at a frequency that is substantially two times greater without increasing the switching frequency of the output transistors of the converter units 9a and 9b. This improves responsiveness with respect to a sudden change of the output voltage Vo in comparison with the current-mode DC-DC converter 100 of FIG. 1. However, the timing at which the output transistors of the converter units 9a and 9b are activated is determined by a pulse signal provided by the oscillator 5. Thus, a time lag is produced between the sudden change in the output voltage Vo and the activation of the output transistor. Therefore, the DC-DC converter 400 cannot sufficiently respond to sudden changes in the output voltage Vo.

The multiphase DC-DC converter 500 of FIG. 5 operates a load with a frequency that is two time greater without increasing the switching frequency of the output transistors of the converter units 10a and 10b. Therefore, the responsiveness to a sudden change in the output voltage Vo is further improved in comparison with the fixed activation time DC-DC converter 300 of FIG. 3.

Additionally, change in the output voltage Vo is detected by the comparator 8, which is operated at a higher speed than the voltage amplifiers 2a and 2b and the error amplifier 4 in FIG. 4. Thus, the multiphase DC-DC converter 500 has better load responsiveness than the multiphase DC-DC converter 400 of FIG. 4. However, the characteristic error of the one-shot flip-flop circuits FFa and FFb may cause a difference in activation time between the converter units 10a and 10b. Further, difference in inductance between the choke coils L1 and L2 will cause a difference between the current flowing through the choke coil L1 and the current flowing through the choke coil L2. An increase in the difference in current may lower efficiency. Furthermore, this may increase the heat generated by one of the converter units and cause a deficiency.

The present invention provides a multiphase DC-DC converter having improved responsiveness with respect to sudden changes in the output voltage while equalizing the output current of a plurality of converter units.

One aspect of the present invention is a multiphase DC-DC converter provided with a plurality of converter units, each including an output transistor activated and inactivated to generate an output voltage. A control unit, connected to the converter units, controls the converter units. The control unit includes a comparator for comparing the output voltage of one of the converter units with a reference voltage to generate a comparison signal. A first control circuit, connected to the comparator, sequentially selects each of the converter units in accordance with the comparison signal and activating the output transistor of the selected converter unit. A second control circuit controls inactivation timing of the output transistor of each of the converter units to equalize output current according to the output voltage generated by each of the converter units.

Another aspect of the present invention is a multiphase DC-DC converter provided with a plurality of converter units, each including an output transistor activated and inactivated to generate an output voltage. A control unit, connected to the converter units, controls the converter units. The control unit includes a comparator for comparing an output voltage of one of the converter units with a reference voltage to generate a comparison signal. A counter performs a count-up operation when the output transistor of each of the converter units is inactivated to generate a select signal. A selection circuit, connected to the comparator and the counter, sequentially selects each of the converter units in accordance with the select signal and activating the output transistor of the selected converter unit in accordance with the comparison signal. A storage circuit stores the peak value of an output current according to the output voltage generated by the selected converter unit. A current comparator generates a drive signal for inactivating the output transistor of the converter unit selected next when an output current according to the output voltage generated by the converter unit selected next reaches the peak value of the output current of the previously selected converter unit.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
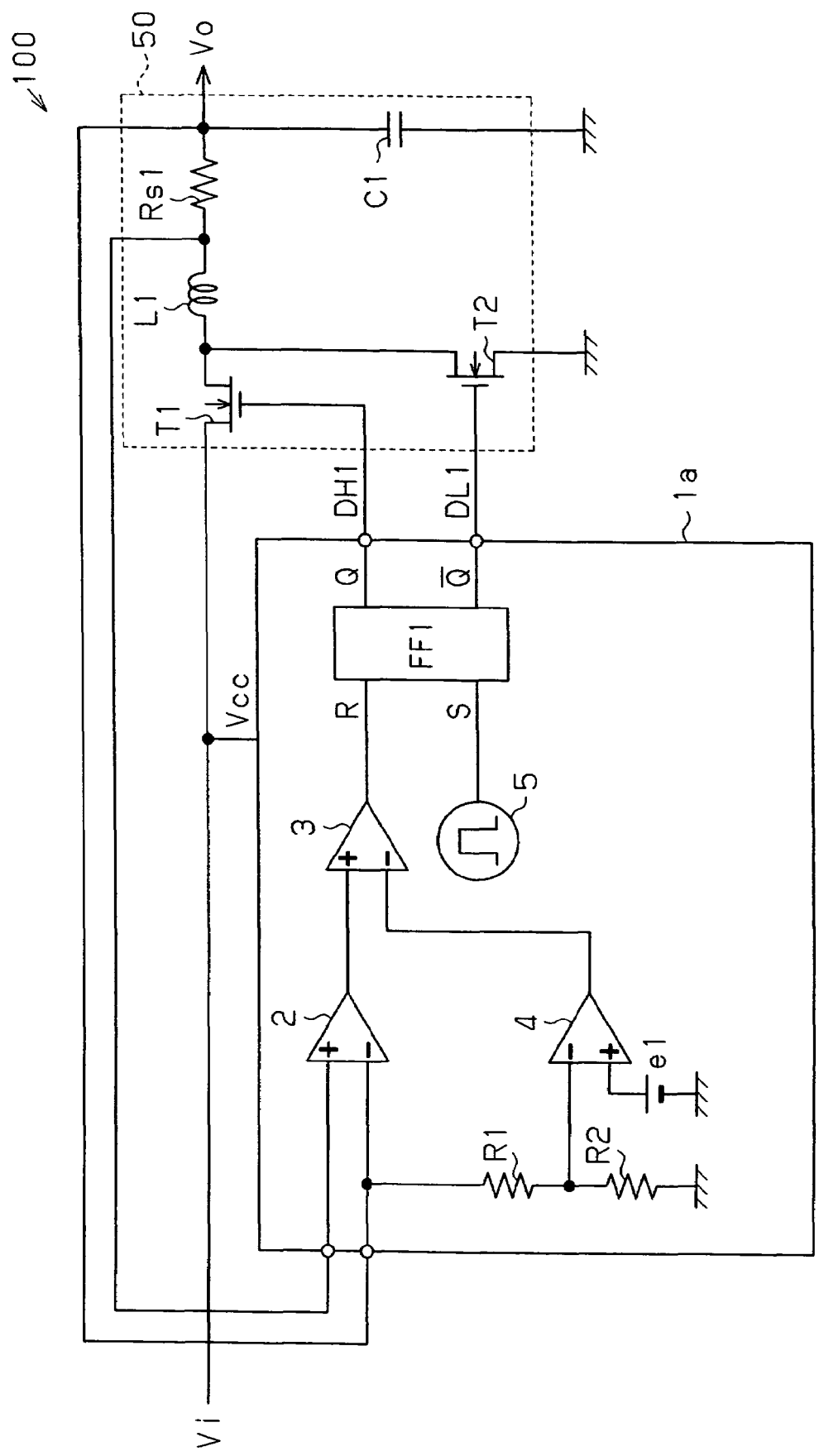
FIG. 1 is a schematic block circuit diagram showing a current-mode DC-DC converter of a first prior art example.
Figure 2:
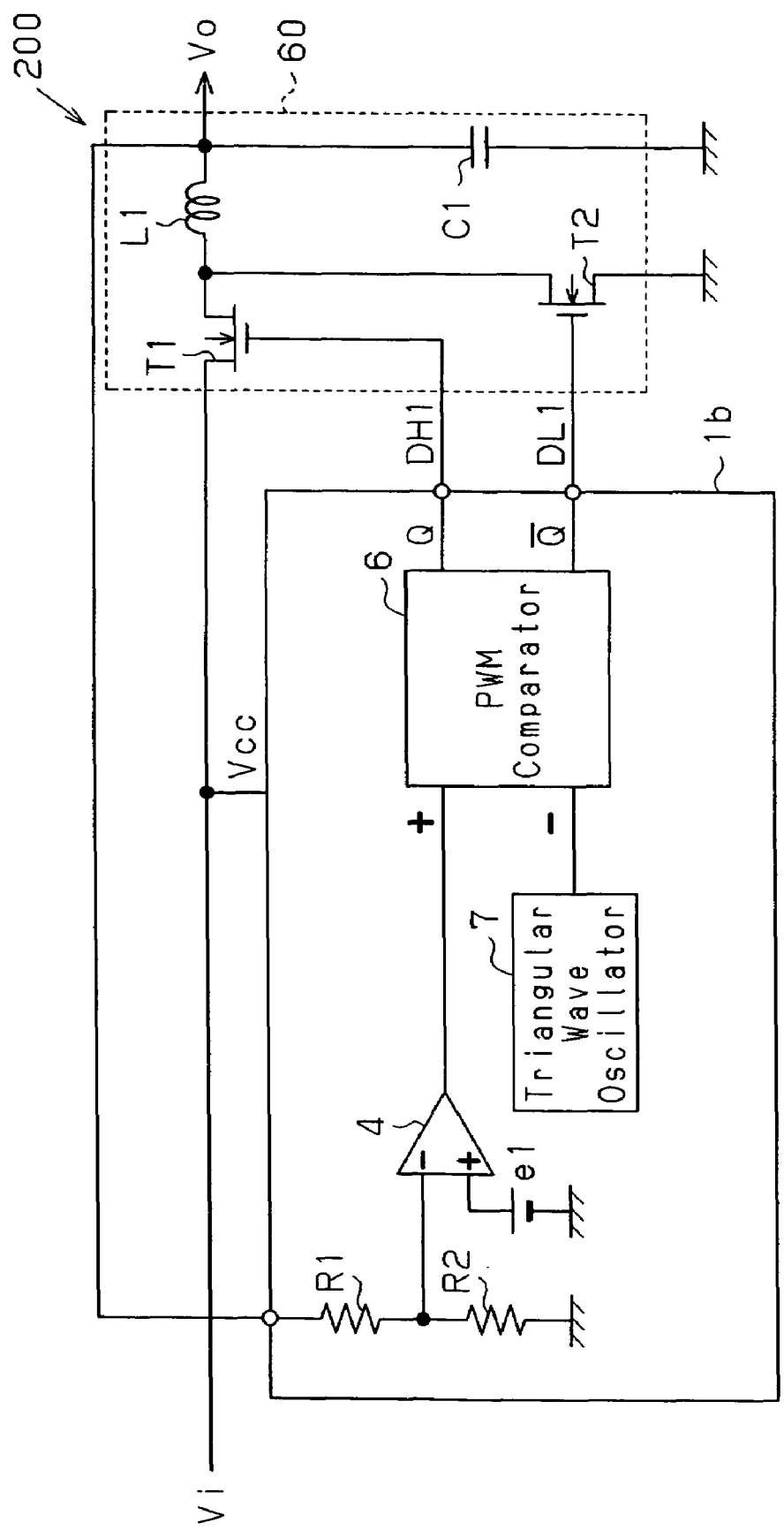
FIG. 2 is a schematic block circuit diagram showing a voltage-mode DC-DC converter of a second prior art example.
Figure 3:
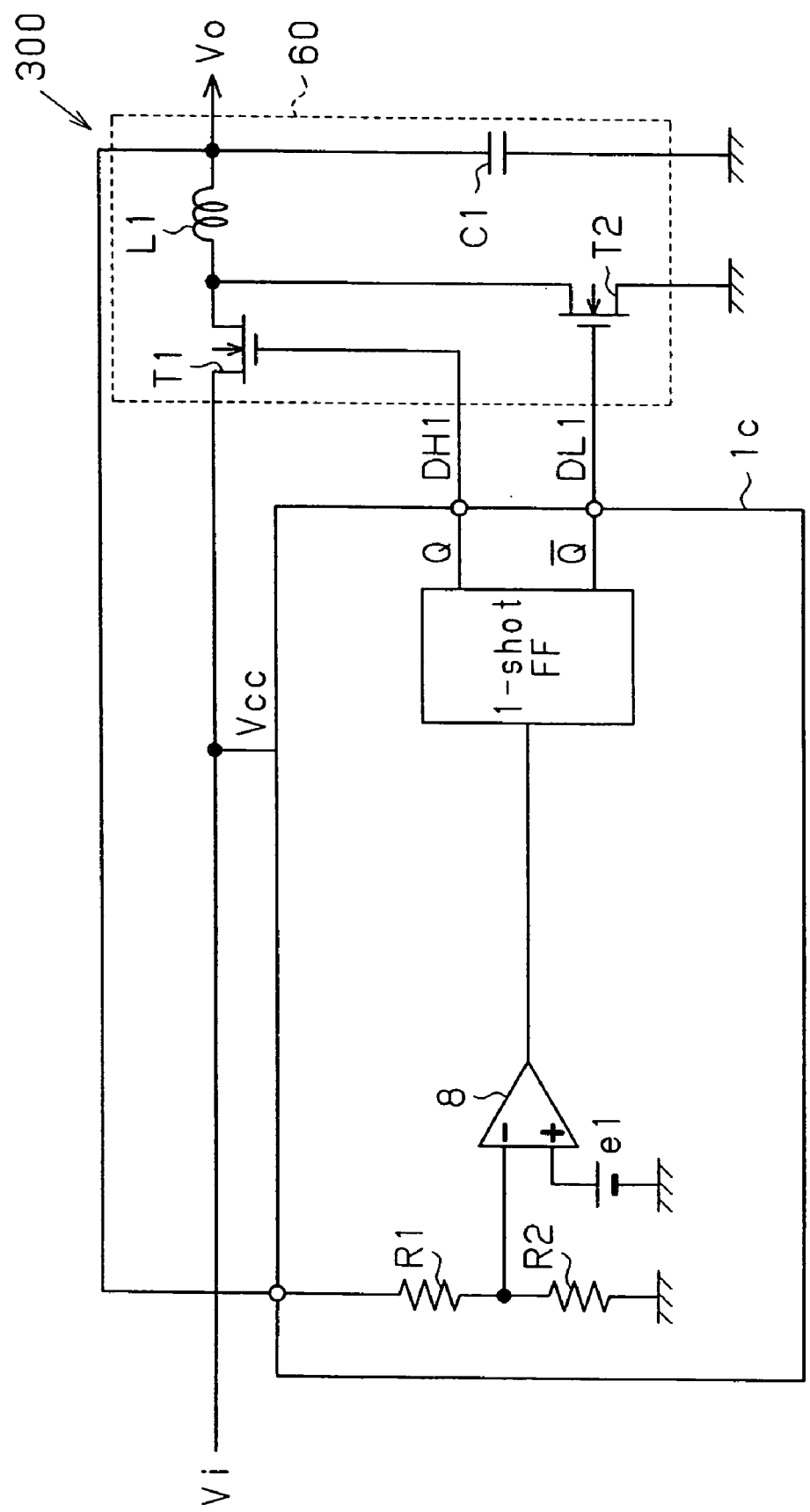
FIG. 3 is a schematic block circuit diagram showing a fixed activation time DC-DC converter of a third prior art example.
Figure 4:
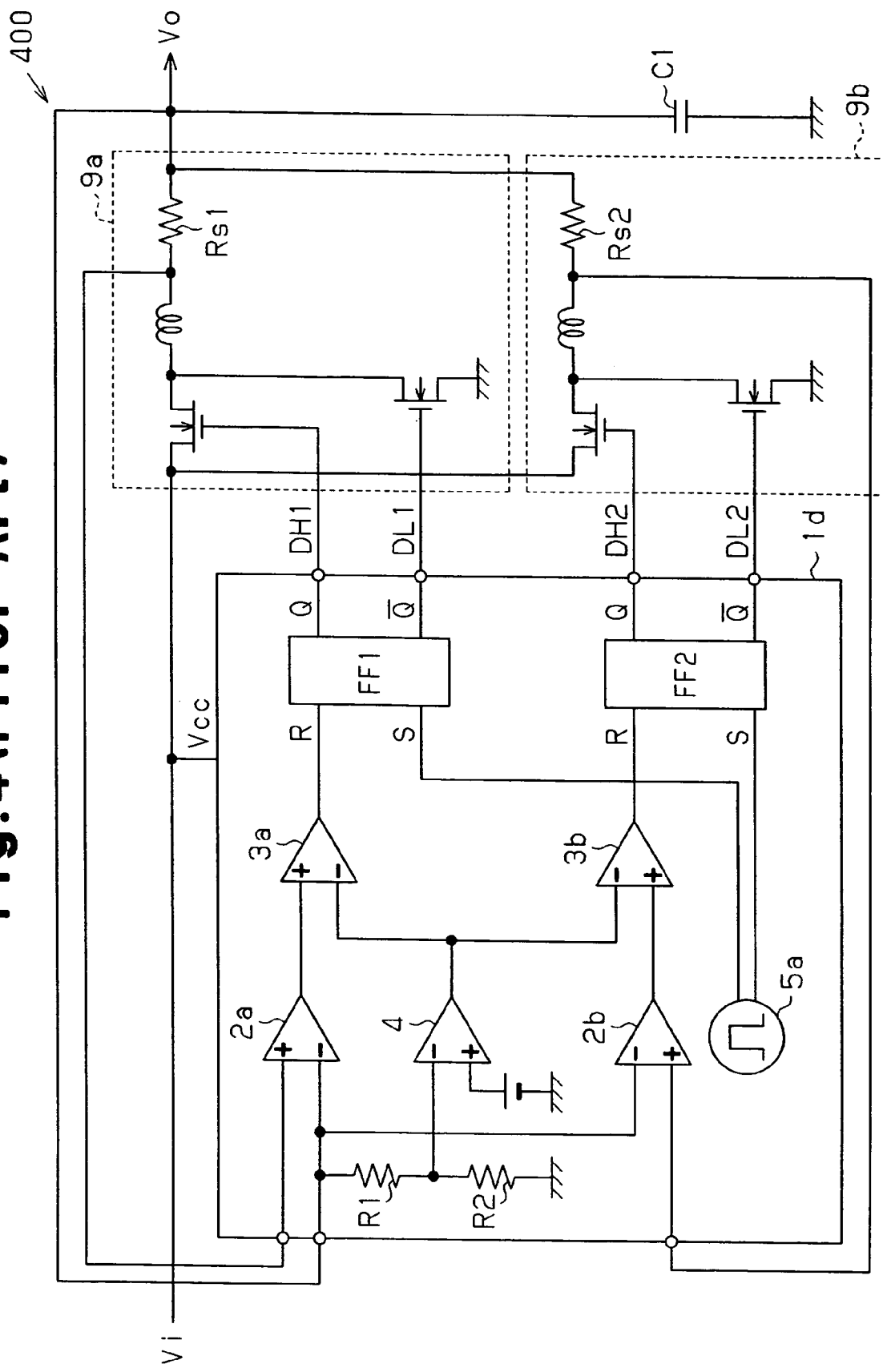
FIG. 4 is a schematic block circuit diagram showing a current-mode multiphase DC-DC converter of a fourth prior art example.
Figure 5:
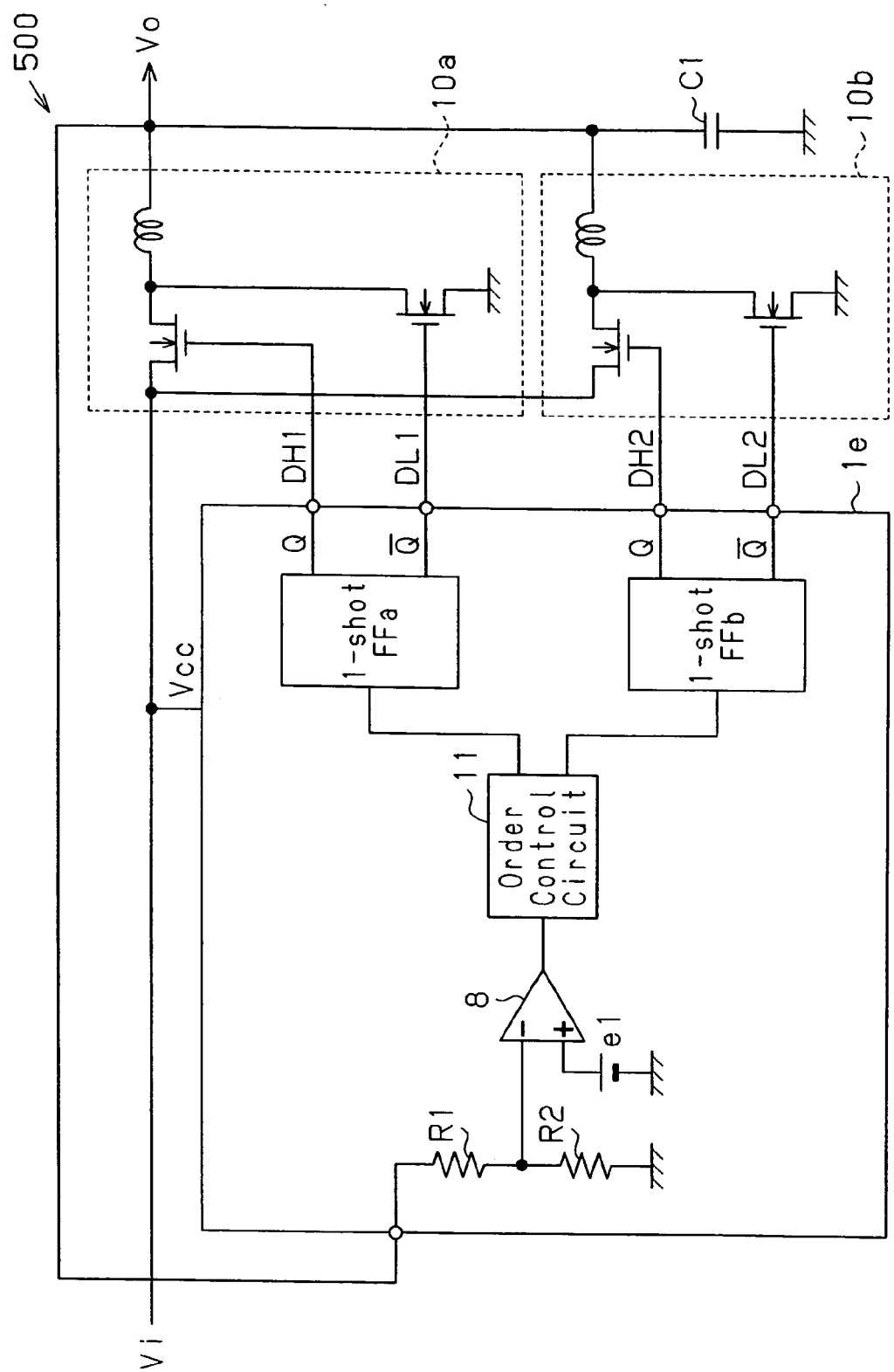
FIG. 5 is a schematic block circuit diagram showing a fixed activation time multiphase DC-DC converter of a fifth prior art example.

In the drawings, like numerals are used for like elements throughout.

Figure 6:
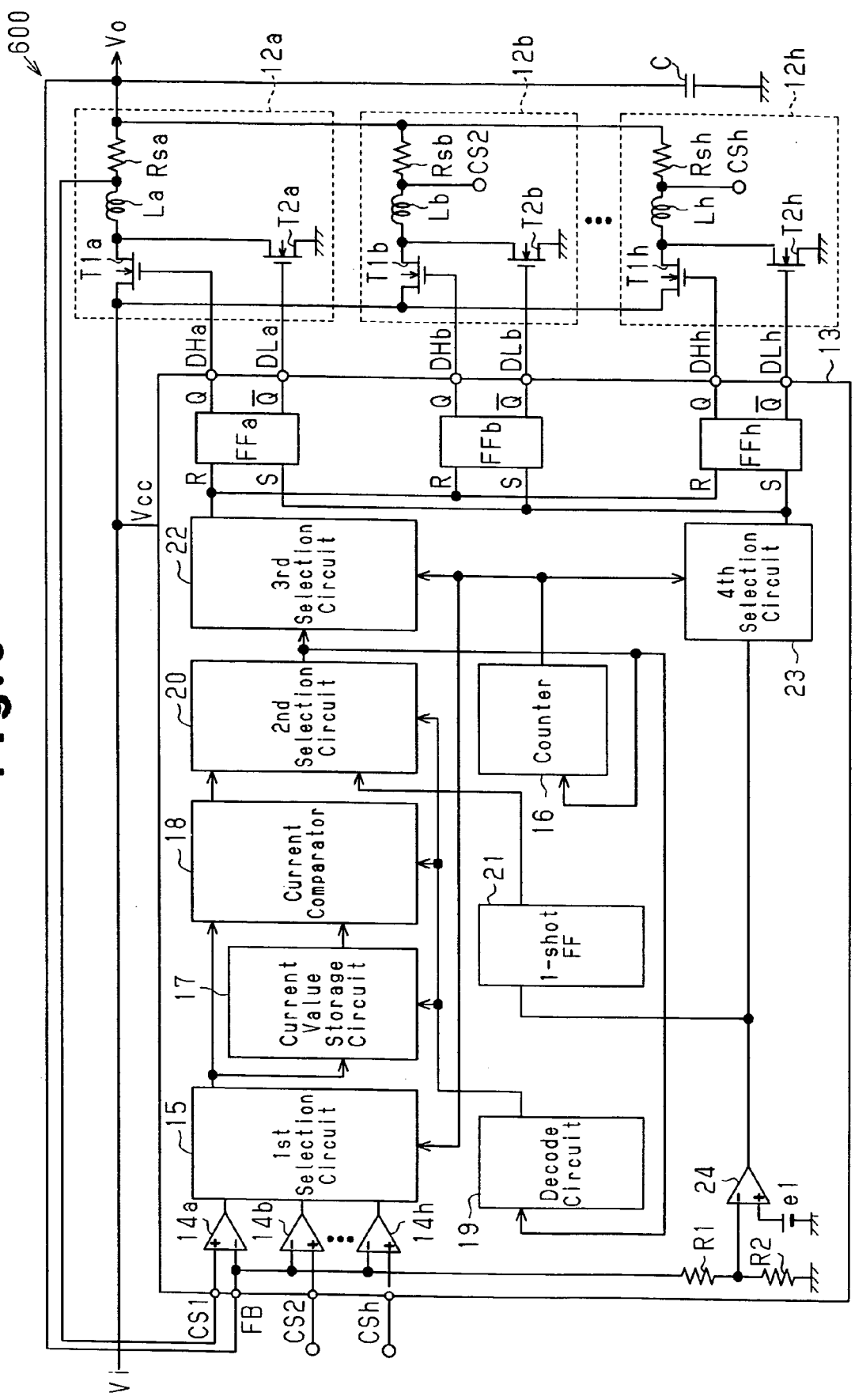
FIG. 6 is a schematic block circuit diagram showing a multiphase DC-DC converter according to a first embodiment of the present invention.

FIG. 6 is a schematic block circuit diagram showing a multiphase DC-DC converter 600 according to a first embodiment of the present invention. The first embodiment is an eight-phase multiphase DC-DC converter. The multiphase DC-DC converter 600 includes eight converter units 12a to 12h, and a control unit 13 for controlling the converter units 12a to 12h. The multiphase DC-DC converter 600 is operable in both the current mode and fixed activation time mode.

The converter units 12a to 12h have the same structure as the converter unit 50 of the current-mode DC-DC converter 100 in FIG. 1. The converter units 12a to 12h include output transistors T1a to T1h, synchronous rectifying transistors T2a to T2h, choke coils La to Lh, and current detection resistors Rsa to Rsh, respectively. The converter units 12a to 12h share a smoothing capacitor C.

The control unit 13 includes eight voltage amplifiers 14a to 14h, four selection circuits 15, 20, 22 and 23, a counter 16, a current value storage circuit 17, a current comparator 18, a decode circuit 19, a one-shot flip-flop circuit 21, a voltage comparator 24, and eight flip-flop circuits FFa to FFh.

The voltage amplifiers 14a to 14h respectively amplify the voltages between the two terminals of the corresponding current detection resistors Rsa to Rsh and provide amplified signals to the first selection circuit 15. The first selection circuit 15 selects one of the amplified signals of the voltage amplifiers 14a to 14h in accordance with a count signal of the counter 16 and provides the selected amplified signal to the current value storage circuit 17 and the current comparator 18.

The current value storage circuit 17 includes a voltage holding circuit with a capacitance capable of holding the peak voltage of the selected amplified signal provided by the first selection circuit 15. When the fixed activation time mode is selected in accordance with a mode setting signal provided by the decode circuit 19, the current value storage circuit 17 holds the voltage of the selected amplified signal provided by the first selection circuit 15.

The current comparator 18 compares the currents flowing through the current detection resistors by comparing the voltage of the selected amplified signal provided from the first selection circuit 15 with the voltage held by the current value storage circuit 17. If the voltage of the selected amplified signal provided by the first selection circuit 15 is higher than the voltage held by the current value storage circuit 17, the current comparator 18 provides an H level comparison signal to the second selection circuit 20. If the voltage of the selected amplified signal provided by the first selection circuit 15 is lower than the voltage held by the current value storage circuit 17, the current comparator 18 provides an L level comparison signal to the second selection circuit 20.

The second selection circuit 20 is provided with the comparison signal from the current comparator 18 and an output signal of the one-shot flip-flop circuit 21. The second selection circuit 20 is also provided with the mode setting signal from the decode circuit 19. When the current mode is set by the mode setting signal, the second selection circuit 20 selects the comparison signal of the current comparator 18 and provides the selected comparison signal to the third selection circuit 22, the counter 16, and the decode circuit 19. When the fixed activation time mode is selected, the second selection circuit 20 provides the output signal of the one-shot flip-flop circuit 21 to the third selection circuit 22, the counter 16, and the decode circuit 19.

Figure 8:
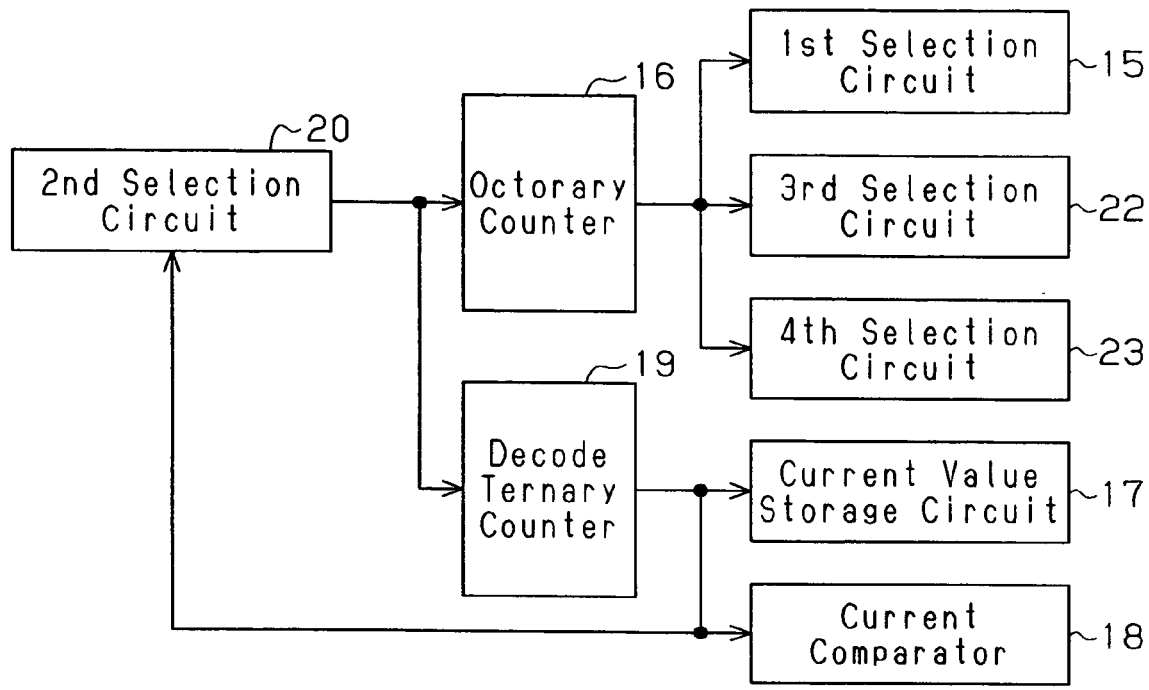
FIG. 8 is a schematic block diagram showing a counter circuit and a decode circuit of the multiphase DC-DC converter of FIG. 6.

The counter 16 is formed by an octonary counter as shown in FIG. 8. The counter 16 performs a count-up operation in response to a falling edge of the output signal of the second selection circuit 20 and provides eight different select signals corresponding to the converter units 12a to 12h to the first, third and fourth selection circuits 15, 22 and 23.

The decode circuit 19 is formed by a ternary counter, which performs a count-up operation in response to a rising edge of the output signal of the second selection circuit 20. When the count value is zero, the decode circuit 19 generates a mode setting signal for setting the fixed activation time mode. When the count value is 1 or 2, the decode circuit 19 generates a mode setting signal for setting the current mode. Therefore, the decode circuit 19 generates a mode setting signal for setting the fixed activation time mode once for every three count-up operations.

The third selection circuit 22 provides the output signal of the second selection circuit 20 to the reset terminal R of one of the flip-flop circuits FFa to FFh in accordance with the select signal provided by the counter 16.

The voltage comparator 24 is provided with the reference voltage e1 and a divided voltage obtained by dividing the output voltage Vo with the resistors R1 and R2. The voltage comparator 24 generates an H level comparison signal when the divided voltage is lower than the reference voltage e1 and generates an L level comparison signal when the divided voltage is higher than the reference voltage e1.

The output signal of the voltage comparator 24 is output to the one-shot flip-flop circuit 21 and the fourth selection circuit 23. When the output signal of the voltage comparator 24 rises to H level, the one-shot flip-flop circuit 21 outputs an output signal, which rises to H level only for a predetermined time period, to the second selection circuit 20.

The fourth selection circuit 23 provides the comparison signal of the voltage comparator 24 to the set terminal S of one of the flip-flop circuits FFa to FFh in accordance with to the select signal provided by the counter 16.

The flip-flop circuits FFa to FFh drive the converter units 12a to 12h, respectively. Complementary output signals Q and /Q of the flip-flop circuits FFa to FFh are provided to the converter units 12a to 12h, respectively, as output signals DHa to DHh and DLa to DLh of the control unit 13.

When any of the output signals DHa to DHh rises to an H level, the corresponding one of the output transistors T1a to T1h is activated. When any of the output signals DLa to DLh rises to an H level, the corresponding one of the synchronous rectifying transistors T2a to T2h is activated.

The operation of the multiphase DC-DC converter 600 will now be described.

In an initial state in which the count value is set to zero, the counter 16 provides a select signal for selecting the converter unit 12a to the first selection circuit 15, the third selection circuit 22, and the fourth selection circuit 23. In the initial state in which the count value is set to zero, the decode circuit 19 provides a set signal for setting the fixed activation time mode to the current value storage circuit 17, the current comparator 18, and the second selection circuit 20.

If the input voltage Vi is supplied in this state, the voltage amplifiers 14a to 14h amplify the respective voltages between the two terminals of the current detection resistors Rsa to Rsh of the corresponding converter units 12a to 12h and provide the amplified signals to the first selection circuit 15. The first selection circuit 15 provides the amplified signal of the voltage amplifier 14a to the current value storage circuit 17 and the current comparator 18 in accordance with the select signal provided by the counter 16.

The current value storage circuit 17 holds, in accordance with the set signal for the fixed activation time mode, the peak value of the voltage of the selected amplified signal provided by the first selection circuit 15 (i.e., the voltage corresponding to the peak current flowing through the current detection resistor Rsa of the converter unit 12a) as the reference current value.

The voltage comparator 24 is provided with a divided voltage obtained by dividing the output voltage Vo with the resistors R1 and R2. If the output voltage Vo has not reached the specified value in the initial state, the voltage comparator 24 provides an H level comparison signal to the one-shot flip-flop circuit 21 and the fourth selection circuit 23.

The fourth selection circuit 23 provides, in accordance with the select signal provided by the counter 16, the comparison signal of the voltage comparator 24 to the set terminal of the flip-flop circuit FFa driving the converter unit 12a. Then, the flip-flop circuit FFa functions to activate the output transistor T1a of the converter unit 12a.

The output signal of the one-shot flip-flop circuit 21 falls to an L level after a predetermined time period from when the H level comparison signal is provided from the voltage comparator 24. Since the fixed activation time mode has been selected by the decode circuit 19, the second selection circuit 20 provides the output signal of the one-shot flip-flop circuit 21 to the third selection circuit 22.

The third selection circuit 22 inverts the output signal of the second selection circuit 20 in accordance with the select signal of the counter 16 and provides the inverted signal to the reset terminal R of the flip-flop circuit FFa. When the inverted signal rises, the output transistor T1a of the converter unit 12a is inactivated and the synchronous rectifying transistor T2a is activated. Accordingly, the converter unit 12a operates in the fixed activation time mode.

When an L level output signal (output signal of the one-shot flip-flop circuit 21) is output from the second selection circuit 20, the counter 16 and the decode circuit 19 perform a count-up operation. The counter 16 then provides a select signal for selecting the flip-flop circuit FFb corresponding to the converter unit 12b to the third and fourth selection circuits 22 and 23 and provides a select signal for selecting the amplified signal of the voltage amplifier 14b, which corresponds to the converter unit 12b, to the first selection circuit 15.

The decode circuit 19 provides the current value storage circuit 17, the current comparator 18, and the second selection circuit 20 with a mode setting signal for setting the current mode in accordance with the count-up operation.

In the current mode, the output voltage Vo is increased by the activation operation of the output transistor T1a of the converter unit 12a. When the divided voltage provided to the voltage comparator 24 becomes higher than the reference voltage e1, the comparison signal of the voltage comparator 24 falls to an L level. Then, the output transistor T1a is inactivated to decrease the output voltage Vo. When the divided voltage becomes lower than the reference voltage e1, the comparison signal of the voltage comparator 24 again rises to an H level.

The H level comparison signal of the voltage comparator 24 is provided from the fourth selection circuit 23 to the set terminal of the flip-flop circuit FFb, and the output transistor T1b of the converter unit 12b is activated to increase the output voltage Vo. Then, the voltage between the two terminals of the current detection resistor Rsb is amplified by the voltage amplifier 14b, and the amplified signal of the voltage amplifier 14b is provided to the current value storage circuit 17 and the current comparator 18 via the first selection circuit 15.

In accordance with the current mode setting signal, the current value storage circuit 17 does not hold the input voltage but holds a voltage value corresponding to the output current of the converter unit 12a. The current comparator 18 compares, in accordance with the current mode setting signal, the voltage of the selected amplified signal from the first selection circuit 15 with the voltage held by the current value storage circuit 17. If the voltage of the first selection circuit 15 (i.e., the voltage of the amplified signal of the voltage amplifier 14b) is higher than the voltage held by the current value storage circuit 17, the current comparator 18 provides an L level comparison signal to the second selection circuit 20.

The second selection circuit 20 selects a comparison signal of the current comparator 18 in accordance with the current mode setting signal and provides the selected comparison signal to the counter 16, the third selection circuit 22, and the decode circuit 19. The third selection circuit 22 provides, in accordance with the select signal from the counter 16, the output signal of the second selection circuit 20 (L level comparison signal) to the reset terminal R of the flip-flop circuit FFb. As a result, the output transistor T1b of the converter unit 12b is inactivated, and the synchronous rectifying transistor T2b is activated. Therefore, the converter unit 12b operates in the current mode, and the timing at which the output transistor T1b is activated corresponds to the timing at which the divided voltage of the output voltage Vo becomes lower than the reference voltage e1. The timing at which the output transistor T1b is inactivated corresponds to the timing at which the value of current flowing through the current detection resistor Rsb becomes substantially equal to the value of the current flowing through the current detection resistor Rsa of the converter unit 12a.

When an L level output signal is generated by the second selection circuit 20, the counter 16 and the decode circuit 19 perform a count-up operation. Then, the counter 16 provides a select signal for selecting the flip-flop circuit FFc, which corresponds to the converter unit 12c, to the third and fourth selection circuits 22 and 23 and provides a select signal for selecting the voltage amplifier 14c, which corresponds to the converter unit 12c to the first selection circuit 15.

The decode circuit 19 provides a mode setting signal for continuously setting the current mode in accordance with the count-up operation to the current value storage circuit 17, the current comparator 18, and the second selection circuit 20. When the output transistor T1b of the converter unit 12b is inactivated to decrease the output voltage Vo, and the comparison signal of the voltage comparator 24 rises to an H level, the converter unit 12c undergoes the same operations as the converter unit 12b.

When the output voltage Vo is increased by the operation of the converter unit 12c, and an L level output signal is provided by the second selection circuit 20, the counter 16 and the decode circuit 19 perform a count-up operation. As a result, the counter 16 provides a select signal for selecting the flip-flop circuit FFd, which corresponds to the converter unit 12d, to the third and fourth selection circuits 22 and 23 and provides a select signal for selecting the voltage amplifier 14d, which corresponds to the converter unit 12d, to the first selection circuit 15.

The decode circuit 19 performs a third count-up operation to provide a mode setting signal, which sets the fixed activation time mode, to the current value storage circuit 17, the current comparator 18, and the second selection circuit 20. As a result, the voltage corresponding to the current flowing through the current detection resistor Rsd is held by the current value storage circuit 17 in accordance with the activation operation of the output transistor T1d of the converter unit 12d. Further, the timing at which the output transistor T1d is inactivated corresponds to the fall timing of the output signal of the one-shot flip-flop circuit 21. Accordingly, the converter unit 12d operates in the same manner as the converter unit 12a.

Subsequently, in accordance with the count-up operation of the decode circuit 19, the converter units 12e and 12f operate again in the current mode and the converter unit 12g operates in the fixed activation time mode. The operations in the current mode and the operation in the fixed activation time mode are thus alternately repeated. In this manner, the first selection circuit 15, the counter 16, the fourth selection circuit 23, and the flip-flop circuits FFa to FFh function as a first control circuit for sequentially selecting the converter units 12a to 12h in accordance with the comparison signal from the voltage comparator 24 to activate the output transistor of the selected converter unit. Further, the current value storage circuit 17, the current comparator 18, the decode circuit 19, the second selection circuit 20, the one-shot flip-flop circuit 21, and the third selection circuit 22 function as a second control circuit for controlling the inactivation timing of the output transistor of each of the converter units 12a to 12h in order to equalize the output currents of the converter units 12a to 12h corresponding to the output voltages generated by the converter unit 12a to 12h.

The multiphase DC-DC converter 600 has the advantages described below.

(1) When the output voltage Vo decreases, the DC-DC converter 600 sequentially operates the converter units 12a to 12h to increase the output voltage Vo. Therefore, responsiveness to change in the output voltage Vo is improved without increasing the switching frequency of the output transistors T1a to T1h of the converter units 12a to 12h.

(2) Asynchronous control is performed to activate the output transistors T1a to T1h of the converter units 12a to 12h when detecting a decrease in the output voltage Vo with the voltage comparator 24. Therefore, the responsiveness to sudden change of the output voltage Vo is improved.

(3) The converter units 12a to 12h perform the fixed activation time mode operation once every three operations to store the value of the current flowing through the current detection resistor in the current value storage circuit 17. The converter units 12a to 12h perform the remaining two operations in the current mode so that the output transistor is inactivated when the value of the current flowing through the current detection resistor reaches the current value stored in the current value storage circuit 17. Accordingly, it is possible to equalize the current flowing through the output transistors and choke coils of the converter units 12a to 12h.

(4) The eight converter units 12a to 12h are sequentially operated performing the fixed activation time mode operation once every three operations. Accordingly, the voltage value held by the current value storage circuit 17 is periodically refreshed. This prevents the voltage value held by the current value storage circuit 17 from being decreased. Further, the converter unit storing the current value is sequentially changed since the eight converter units 12a to 12h perform the fixed activation time mode operation once every three operations. Accordingly, the current value that is used as the reference is sequentially changed. Thus, the converter units 12a to 12h are operated at a current value with the characteristic errors of the converter units 12a to 12h being averaged out.

Figure 7:
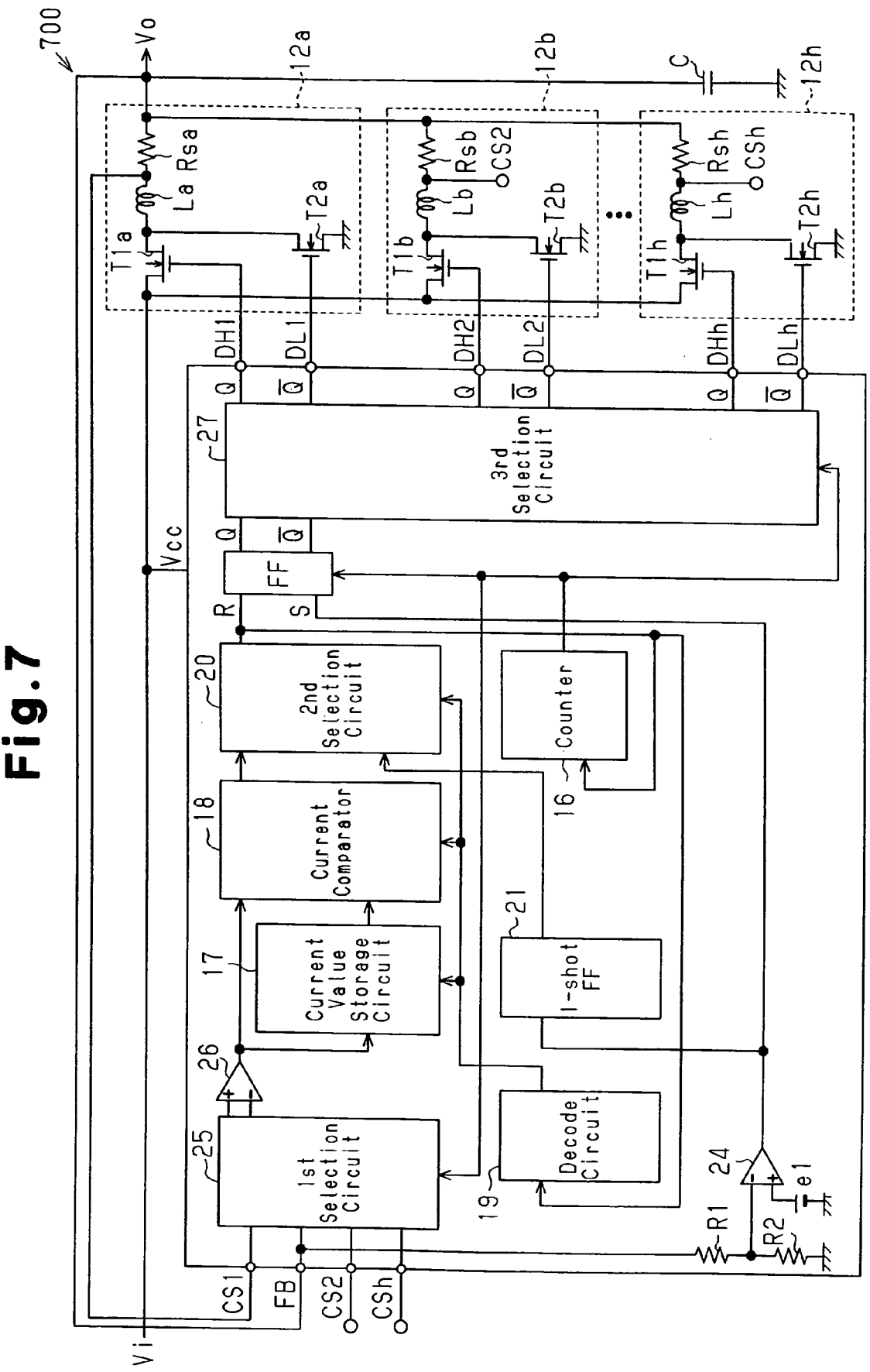
FIG. 7 is a schematic block circuit diagram showing a multiphase DC-DC converter according to a second embodiment of the present invention.

FIG. 7 is a schematic block circuit diagram of a multiphase DC-DC converter 700 according to a second embodiment of the present invention. The second embodiment differs from the first embodiment in that it is configured so that the voltages between the two terminals of current detection resistors Rsa to Rsh of converter units 12a to 12h are selectively amplified (a first selection circuit 25 and a voltage amplifier 26), and that it is configured so that the converter units 12a to 12h are selectively operated (a flip-flop circuit FF and a third selection circuit 27).

The first selection circuit 25 selects a voltage from the voltages between the two terminals of the current detection resistor Rsa to Rsh of the converter units 12a to 12h in accordance with a select signal provided from a counter 16. Then, the first selection circuit 25 provides the selected voltage signal to the voltage amplifier 26. The voltage amplifier 26 amplifies the selected voltage signal and provides the amplified signal to a current value storage circuit 17 and a current comparator 18.

An output signal of a second selection circuit 20 is provided to the reset terminal R of the flip-flop circuit FF, and a comparison signal of a voltage comparator 24 is provided to the set terminal S of the flip-flop circuit FF. A third selection circuit 27 receives output signals Q and /Q from the flip-flop circuit FF and provides the output signals Q and /Q of the flip-flop circuit FF to one of converter units 12a to 12h in accordance with a select signal provided from the counter 16.

Such configuration enables the use of a single voltage amplifier 26 regardless of the number of converter units 12a to 12h. Further, this configuration enables the use of a single flip-flop circuit FF regardless of the number of converter units 12a to 12h.

The multiphase DC-DC converter 700 of the second embodiment has the same advantages as the multiphase DC-DC converter 600 of the first embodiment. Additionally, the second embodiment has less voltage amplifiers and less flip-flop circuits compared with the first embodiment.

It should be apparent to those skilled in the art that the present invention may be embodied in many other specific forms without departing from the spirit or scope of the invention. Particularly, it should be understood that the invention may be embodied in the following forms.

Figure 9:
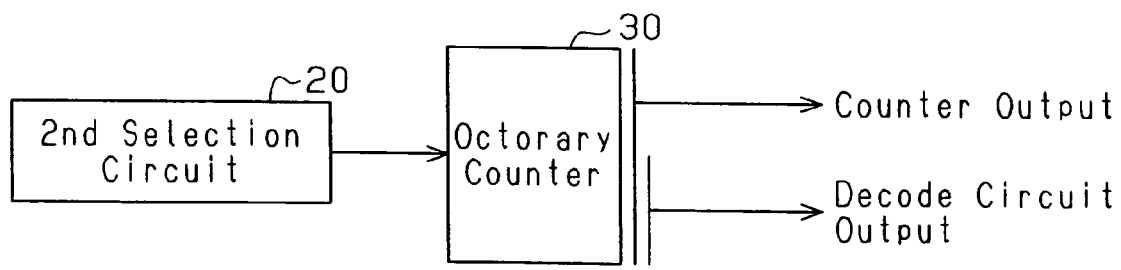
FIG. 9 is a schematic block diagram showing another example of a counter circuit and a decode circuit.

As shown in FIG. 9, an octorary counter 30 may be used in place of the counter 16 and the decode circuit 19. In this case, the lower two bits of the output signal of the octorary counter 30 are used as the mode setting signal of the decode circuit 19. If the setting is such that the fixed activation time mode is performed when the lower two bits of the output signal of the counter 30 are 00, only the converter units 12a and 12e will operate in the fixed activation time mode. Therefore, the converter units operating in the fixed activation time mode are fixed.

The switching frequency of the output transistor may be kept constant regardless of a change in the output voltage by variably controlling the time at which the output signal of the one-shot flip-flop circuit 21 rises to an H level. More specifically, the time during which the one-shot flip-flop circuit 21 outputs an H level signal may be controlled such that the ratio of the output voltage Vo relative to the input voltage Vi coincides with the ratio of the activation time of the output transistor relative to the switching cycle of the output transistor. The output time control circuit may be configured by a time constant circuit that includes an operational amplifier and a comparator.

A fixed voltage may be supplied to the current comparator 18 in lieu of the output voltage of the current value storage circuit 17 in order to prevent overcurrent during the fixed activation time mode operation. To prevent the output transistor from being activated for a long time during the current mode operation due to short circuit of the sensing resistor, for example, a time constant that is two times greater than normal may be set for the one-shot flip-flop circuit. In this case, the second selection circuit 20, which switches between the fixed activation time mode and the current mode, may perform parallel processing with an OR circuit to validate the signal from the current comparator 18 and the signal from the one-shot flip-flop circuit. Such configuration avoids abnormal operation.

In the DC-DC converter having eight converter units, for example, two converter groups, each including four converter units and each generating an output voltage, may be operated at different timings in the fixed activation time mode and the current mode. The two converter groups may be operated in accordance with a signal from a common current value storage circuit to equalize the current flowing through the output transistors of the converter units while increasing the on-duty of the output transistors.

The present examples and embodiments are to be considered as illustrative and not restrictive and the invention is not to be limited to the details given herein, but may be modified within the scope and equivalence of the appended claims.

What is claimed is:

1. A multiphase DC-DC converter comprising:
   a plurality of converter units, each including an output transistor activated and inactivated to generate an output voltage; and
   a control unit, connected to the converter units, for controlling the converter units, the control unit including:
      a comparator for comparing the output voltage of one of the converter units with a reference voltage to generate a comparison signal;
      a first control circuit, connected to the comparator, for sequentially selecting each of the converter units in accordance with the comparison signal and activating the output transistor of the selected converter unit; and
      a second control circuit for controlling inactivation timing of the output transistor of each of the converter units to equalize output current according to the output voltage generated by each of the converter units.

2. The multiphase DC-DC converter according to claim 1, wherein the first control circuit includes:
   a counter for performing a count-up operation when the output transistor of each of the converter units is inactivated to generate a select signal; and
   a selection circuit, connected to the counter, for sequentially selecting each of the converter units in accordance with the select signal.

3. The multiphase DC-DC converter according to claim 1, wherein the first control circuit includes:
   a flip-flop circuit, connected to the comparator, to generate a drive signal for driving the output transistor of each of the converter units in response to the comparison signal;
   a counter for performing a count-up operation when the output transistor of each of the converter units is inactivated to generate a select signal; and
   a selection circuit, connected to the flip-flop circuit and the counter, for sequentially selecting each of the converter units in accordance with the select signal and providing the drive signal to the selected converter unit.

4. The multiphase DC-DC converter according to claim 1, wherein each of the converter units includes a resistor for detecting the output voltage, and the first control circuit includes:
   a counter for performing a count-up operation when the output transistor of each of the converter units is inactivated to generate a select signal; and
   a selection circuit, connected to the resistor of each of the converter units and to the counter, for sequentially selecting the output voltage detected by the resistor of each of the converter units in accordance with the select signal.

5. The multiphase DC-DC converter according to claim 1, wherein the plurality of converter units includes a first converter unit and a second converter unit, and the second control circuit performs:
   a first operation for storing a peak value of the output current of the first converter unit when the first converter unit is selected; and
   a second operation for inactivating the output transistor of the second converter unit when the output current of the second converter unit, selected subsequent to the first converter unit, reaches the stored peak value of the output current of the first converter unit.

6. The multiphase DC-DC converter according to claim 1, wherein the plurality of converter units includes a first converter unit and a second converter unit, and the second control circuit performs:

a fixed activation time mode operation for activating the output transistor of the first converter unit for a predetermined period of time in accordance with the comparison signal of the comparator to hold the peak value of the output current of the first converter unit as a reference current value; and a current mode operation for activating the output transistor of the second converter unit in accordance with the comparison signal of the comparator, and for inactivating the output transistor of the second converter unit when the current value of the second converter unit reaches the reference current value.

7. The multiphase DC-DC converter according to claim 6, wherein the second control circuit includes a one-shot flip-flop circuit, connected to the comparator, to set an activation time for the output transistor of the first converter unit in response to the comparison signal.

8. The multiphase DC-DC converter according to claim 6, wherein the second control circuit includes a decode circuit for sequentially setting the fixed activation time mode and the current mode in accordance with when the output transistor of each of the converter units is inactivated.

9. The multiphase DC-DC converter according to claim 8, wherein the decode circuit sets the first converter unit in the fixed activation time mode operation, and then the second converter unit in the current mode operation.

10. The multiphase DC-DC converter according to claim 9, wherein the decode circuit sets at least two successive converter units in the current mode operation.

11. The multiphase DC-DC converter according to claim 9, wherein the decode circuit intermittently sets each of the converter units in the fixed activation time mode operation.

12. A multiphase DC-DC converter comprising:

a plurality of converter units, each including an output transistor activated and inactivated to generate an output voltage; and a control unit, connected to the converter units, for controlling the converter units, the control unit including:

a comparator for comparing an output voltage of one of the converter units with a reference voltage to generate a comparison signal;

a counter for performing a count-up operation when the output transistor of each of the converter units is inactivated to generate a select signal;

a selection circuit, connected to the comparator and the counter, for sequentially selecting each of the converter units in accordance with the select signal and activating the output transistor of the selected converter unit in accordance with the comparison signal;

a storage circuit for storing the peak value of an output current according to the output voltage generated by the selected converter unit; and a current comparator for generating a drive signal for inactivating the output transistor of the converter unit selected next when an output current according to the output voltage generated by the converter unit selected next reaches the peak value of the output current of the previously selected converter unit.

13. The multiphase DC-DC converter according to claim 12, wherein the converter units each include a resistor for detecting the output voltage, the multiphase DC-DC converter further comprising a selection circuit connected to the resistor of each of the converter units and the counter to sequentially select the output voltage detected by the resistor of each of the converter units in accordance with the select signal.

14. The multiphase DC-DC converter according to claim 12, further comprising a decode circuit, connected to the counter, for sequentially setting each of the converter units in a fixed activation time mode and a current mode in accordance with the select signal when the output transistor of each of the converter units is inactivated, wherein the fixed activation time mode activates the output transistor for a predetermine period of time, and the current mode inactivates the output transistor with the current comparator.

15. The multiphase DC-DC converter according to claim 14, further comprising:

a one-shot flip-flop circuit, connected to the comparator, for generating, in response to the comparison signal, a set signal for setting an activation time of the output transistor during the fixed activation time mode; and a selection circuit, connected to the current comparator, the decode circuit, and the one-shot flip-flop circuit, to select the set signal or the drive signal in accordance with the mode set by the decode circuit.

* * * * *